(12) United States Patent
Cornell

(10) Patent No.: US 6,188,666 B1
(45) Date of Patent: Feb. 13, 2001

(54) RESTORATION METHOD FOR MULTIPLEXED CIRCUITS

(75) Inventor: Peter S. Cornell, Conyers, GA (US)

(73) Assignee: AT&T Corp., New York, NY (US)

( * ) Notice: Under 35 U.S.C. 154(b), the term of this patent shall be extended for 0 days.

(21) Appl. No.: 09/067,576

(22) Filed: Apr. 28, 1998

(51) Int. Cl.$^7$ .............................. G01R 31/08; G06F 11/00
(52) U.S. Cl. ............................ 370/217; 370/228; 370/244; 340/827
(58) Field of Search ............................. 370/217, 220, 370/222, 223, 227, 228, 244; 379/221; 709/239; 340/825.01, 825.03, 826, 827

(56) References Cited

U.S. PATENT DOCUMENTS

| | | | | |
|---|---|---|---|---|
| 3,870,955 | * | 3/1975 | Ouvrier | 455/8 |
| 4,704,724 | * | 11/1987 | Krishnan et al. | 379/221 |
| 4,853,927 | * | 8/1989 | Wenzel | 370/218 |
| 4,991,204 | * | 2/1991 | Yamamoto et al. | 379/221 |
| 5,182,744 | * | 1/1993 | Askew et al. | 370/228 |
| 5,218,601 | * | 6/1993 | Chujo et al. | 370/228 |
| 5,684,807 | * | 11/1997 | Bianchini, Jr. et al. | 714/712 |

* cited by examiner

Primary Examiner—Seema S. Rao
Assistant Examiner—Saba Tsegaye

(57) ABSTRACT

Restoration of a multiplexed circuit in a network (10) is effected in accordance with the probability of failure of that circuit determined in accordance with: (1) how many constituent circuits in the multiplexed circuit are provisioned for service; (2) how many constituent circuits in the multiplexed circuit have failed and (3) how many constituent circuits in the multiplexed circuit are in service and out of service. If the probability of failure differs from a prescribed reference value by a predetermined threshold, a processor (28) effects restoration by choosing an alternate path.

12 Claims, 1 Drawing Sheet

RESTORATION METHOD FOR MULTIPLEXED CIRCUITS

TECHNICAL FIELD

This invention relates to a technique for restoring multiplexed traffic streams in a network based on the status of the constituents within each multiplexed stream.

BACKGROUND ART

Providers of telecommunications services, such as AT&T, typically transport inter-city traffic in a digitally multiplexed format. Some providers of telecommunications services implement TI digital carrier systems that multiplex twenty-four constituent 64-kilobit (DS0) digitized circuits (signals) to yield a 1.544 Megabit per second (Mbps) stream. Other carriers, such as AT&T, operate transmission T3 systems that have the capacity to multiplex twenty-eight constituent Ti circuits. The constituent Ti circuits that yield the multiplexed T3 circuit are typically, although not necessarily, associated with different service offerings. For example, a typical T3 circuit may comprise individual Ti circuits associated with ADL, Intertoll, and dedicated services, to name a few.

Presently, the nature of the particular traffic carried by the constituent TI circuits of a multiplexed T3 circuit plays a role in establishing the restoration priority of that T3 circuit in the event of a failure. For example, some restoration techniques afford higher priority to T3 circuits whose constituent T1 circuits carry certain traffic, say private line traffic, than those T3 circuits that carry other types of traffic.

Aside from the nature of the particular traffic on the constituent T1 circuits of a multiplexed T3 circuit, the individual status of each constituent T1 circuit has previously played no role in the decision regarding a restoration of a multiplexed T3 circuit. Thus, assuming a set of individual T1 circuits that carry traffic of the same priority, current restoration techniques may undertake restoration of a T3 circuit having very few if any failed T1 circuits prior to undertaking restoration of a T3 circuit having many failed TI circuits. Since no account is typically taken of the actual status of the constituent circuits in a multiplexed circuit, a technician using any of several present day restoration techniques may attempt restoration of a T3 circuit containing a small number of TI circuits when in fact the T3 only contains that many active TI circuits and does not in fact require restoration.

Thus, there is need for a technique for accomplishing restoration that overcomes the deficiencies of the prior art.

BRIEF SUMMARY OF THE INVENTION

Briefly, the present invention provides a restoration technique for restoring a at least one multiplexed circuits, such as a T3 circuit, for example, in accordance with the status of the constituent circuits (e.g., T1 circuits) comprising the multiplexed circuit. In accordance with the invention, a determination is made regarding the probability of failure of the multiplexed circuit in accordance with: (1) the number of constituent circuits within that multiplexed circuit actually provisioned for service, (2) the number of actual failed circuits and (3) the number of operative and out-of service individual circuits. If the failure probability differs from a prescribed value by a set threshold, the multiplexed circuit is restored. In this way, faster restoration is achieved.

DETAILED DESCRIPTION

Figure 1:
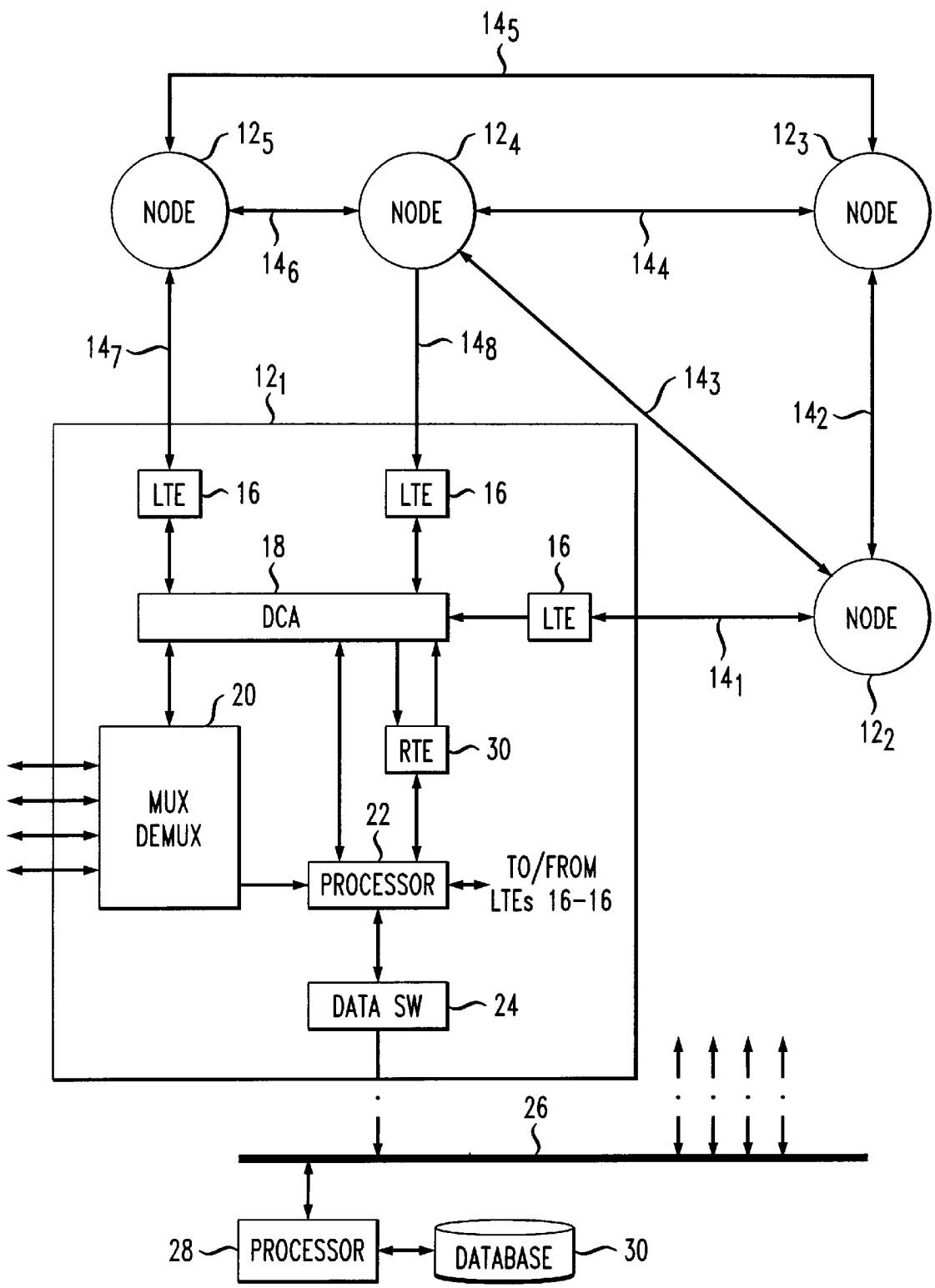
FIG. 1 illustrates a block diagram of a transmission system for accomplishing restoration in accordance with the invention.

FIG. 1 illustrates a transmission system 10 that achieves improved restoration in accordance with the invention. The network 10 comprises a plurality of nodes $12_1$–$12_n$ where n is an integer. The nodes $12_1$–$12_n$ are linked to each other via transmission channels $14_1$–$14_k$ where k is an integer. Typically, each of the transmission channels comprises one or more optical fibers that each carry a multiplexed digital circuit (signal), such as a T3 circuit, comprised of a plurality of constituent circuits (e.g., twenty-eight Ti circuits in a T3 circuit.) In the illustrated embodiment where n=five and k=eight, the node pairs are by the transmission channels $14_1$–$14_k$ as indicated in Table I.

TABLE I

| Node Pairs | Linking Transmission Channel |
|---|---|
| $12_1$, $12_2$ | $14_1$ |
| $12_2$, $12_3$ | $14_2$ |
| $12_2$, $12_4$ | $14_3$ |
| $12_3$, $12_4$ | $14_4$ |
| $12_3$, $12_5$ | $14_5$ |
| $12_4$ $12_5$ | $14_6$ |
| $12_1$, $12_5$ | $14_7$ |
| $12_1$ $12_4$ | $14_8$ |

The linkage of the node pairs by the corresponding transmission channel listed in Table I is not crucial to the restoration technique of the invention. All that is necessary is the existence of redundant transmission channel linkages so that an alternate path is possible should a transmission channel become incapable of carrying traffic, either because of the channel itself, or its termination at one or both of the nodes linked by the channel.

The nodes $12_1$–$12_n$ each possess substantially the same structure as described in U.S. Pat. No. 5,182,744, issued on Jun. 26, 1993, in the name of James Askew et al., and assigned to AT&T (herein incorporated by reference). For purposes of simplicity, only the details of node $12_1$ are presented. As seen in FIG. 1, a piece of Line Termination Equipment (LTE) 16 within the node $12_1$ terminates each transmission channel linking the node to another. A Digital Cross-Connect Access system (DCA) 18, such as the DACS III system manufactured by Lucent Technologies, Inc., cross-connects the LTE pieces 16—16, thus allowing a connection between the multiplexed circuit carried by a first transmission channel, say channel $14_1$, and another such channel, such as channel $14_7$ or $14_8$.

In the illustrated embodiment, the node $12_1$ possesses the capability to originate and terminate traffic, as well as to re-transmit traffic from another node. To that end, the node $12_1$ includes a multiplexer/de-multiplexer 20 connected to the DCA 18. The multiplexer/de-multiplexer 20 finctions to multiplex constituent circuits (e.g. T1 circuits) received from a piece of telecommunications equipment such as a switch (not shown) to yield a multiplexed circuit (e.g., a T3 circuit) for connection via the DCA 18 to one of the LTE pieces 16—16 and transmission therefrom to another node. Conversely, the multiplexer/de-multiplexer 20 serves to de-multiplex a multiplexed circuit received via the DCA 18 from one of the LTE pieces 16—16 into its constituent circuits.

An alarm processor 22 within the node $12_1$ monitors the LTE pieces 16—16 to determine the status of each multiplexed circuit, such as a T3 circuit, at each LTE. Additionally, the processor 22 may also monitor the multiplexer/de-multiplexer 20 to determine the status of the constituent circuits that comprise the multiplexed circuit originating from, and/or terminating at the node $12_1$. Based on such monitoring, the processor 22 determines whether an alarm condition exists, and if so, whether or not to communicate such information via a data switch 24 onto a network 26 that connects the alarm processors in each of the other nodes $12_2$–$12_n$. The network 26 communicates the alarm information from the processor 22 in each node to a central processor 28. Although not shown, a satellite communication system may also link the processor 28 to processor 22 within each of the nodes $12_1$–$12_n$ to provide redundant communication.

Heretofore, the processor 28, in response to an alarm from the processor 22 in an affected node, say node $12_1$, would effect restoration by establishing a restoration path and thereafter communicating that information to the processor in the affected node. The alarm processor 22 in the affected node would then test for end-to-end continuity within the DCA 18 for the proposed restoration path via a piece of Restoration Test Equipment 30. If the proposed restoration path tested successfully for end-to-end continuity, the alarm processor 22 would signal the DCA 16 to make the necessary cross-connections to implement the proposed path.

In effecting restoration in the manner just described, the processor 28 did not take account of the individual status of the constituent circuits comprising each multiplexed circuit carried by each LTE 16. Rather, the processor 28 simply assumed that each multiplexed circuit comprised a full complement of constituent circuits. (Thus, for example, the processor 28 assumed that each T3 circuit comprises twenty-eight T1 circuits regardless of the number constituent circuits actually provisioned.) In contrast to the prior art, the present invention accomplishes restoration of a multiplexed circuit, e.g. a T3 circuit, in accordance with the status of its constituent circuits, i.e., the individual T1 circuits. To that end, the processor 28 is linked to a data base 30 that maintains a record of each multiplexed circuit. In other words, for each T3 circuit, the database 30 stores information that indicates the number of actually provisioned constituent circuits and their respective status. Using the information stored in the data base 30, the processor 28 statistically establishes the likelihood of failure of a given multiplexed circuit to better determine whether restoration should be effected.

Moreover, as will be discussed, the likelihood of failure established by the processor 28 can also establish the relative order of priority of restoration among the different multiplexed circuits.

In the illustrated embodiment, the processor 28 determines a probability factor (T3FAIL) indicative of the likelihood of failure of given multiplexed (e.g., T3) circuit in accordance with the following mathematical relationship:

$$T_{3FAIL} = F_{om} - X(T_{1FAIL}) + Y(T_{1UNRPT}) - Z \quad \text{(Equation 1)}$$

Where:

$F_{om}$ is a Figure of Merit, reflecting the number of constituent circuits (e.g., T1s) actually equipped and provisioned for service;

X is a constant ranging from 0–1 that determines how much weight will be associated with reported T1 failures. (Different T1s may be assigned different values; e.g., message circuits may be assigned 0.6, dedicated circuits may be assigned 1.0);

$T_{1FAIL}$ is the number of reported constituent (e.g., T1) circuit failures on the multiplexed (e.g., T-3) circuit;

Y is a constant ranging from 0–1 that determines how much weight will be associated with confirmed constituent circuits (T1s) which test satisfactory or are in a "Don't care" state, (T1s that are provisioned but out of service may be assigned a weight of 0.0 removing them from Equation 1);

$T_{1UNRPT}$ is the number of constituent circuits (T1s) which pass all tests or are out of service, thus accounting for full capacity of the multiplexed circuit, and thus in the case of a T3 circuit, $T_{1FAIL} + T_{1UNRPT}$ must equal twenty-eight; and Z is a factor, ranging from −28 to +28 and reflects a class-of-service designation for the multiplexed circuit, thus allowing an alternate service vendor providing leased capacity to be accorded a higher weight failure factor, assuring quicker restoration, as compared to a core multiplexed circuit.

In operation, the processor 28 periodically checks for a possible failure of each multiplexed circuit (e.g., each T3), by accessing the database 30 and then compureting the likelihood of failure value T3FAIL in accordance with Equation 1. Thereafter, the processor 28 then compares the computed probability of failure value to a prescribed reference value, say unity. For each multiplexed circuit whose failure value $T_{3FAIL}$ differs from the prescribed reference value by at least a threshold value, the processor 28 generates an alert. In the preferred embodiment, if the probability of failure value $T_{3FAIL}$ is zero or less, the processor 28 provides an alert and may either effect restoration automatically or signal a technician to effect such restoration manually. Moreover, the processor 28 can rank order the $T_{3FAIL}$ values for a set of multiplexed circuits to establish the priority for restoration on a periodic basis.

The foregoing discloses a technique for facilitating restoration of a multiplexed circuit in accordance with the status of its constituent circuits.

The above-described embodiments are merely illustrative of the principles of the invention. The skilled artisan may make various modifications and changes which will embody the principles of the invention and fall within the spirit and scope thereof.

What is claimed is:

1. A method for restoring within a network at least one multiplexed circuit formed by multiplexing a plurality of constituent circuits, comprising:

(a) determining a probability of failure of said one multiplexed circuit in accordance with (1) how many constituent circuits in the multiplexed circuit are provisioned for service; (2) how many constituent circuits in the multiplexed circuit have failed and (3) how many constituent circuits in the multiplexed circuit are in service and out of service;

(b) comparing the probability of failure of said multiplexed circuit to a prescribed value, and if the probability of failure value differs from the set value by more than a predetermined threshold, then (c) restoring the multiplexed circuit by providing an alternate path.

2. The method according to claim 1 wherein the determining step includes the step of accessing a data base containing a record for said one multiplexed circuit that specifies: (1) how many constituent circuits in the multiplexed circuit are provisioned for service; (2) how many constituent circuits in the multiplexed circuit have failed and (3) how many constituent circuits in the multiplexed circuit are in service and out of service.

3. The method according to claim 1 wherein the probability of failure of failure is determined in accordance with the relationship:

$$T_{3FAIL} = F_{om} - X(T_{1FAIL}) + Y(T_{1UNRPT}) - Z \quad \text{(Equation 1)}$$

Where:

$F_{om}$ is a Figure of Merit, reflecting the number of constituent circuits actually equipped and provisioned for service;

X is a constant ranging from 0–1 that determines how much weight will be associated with reported failures of constituent circuits;

$T_{1FAIL}$ is the number of reported constituent circuit failures in the multiplexed circuit;

Y is a constant ranging from 0–1 that determines how much weight will be associated with confirmed constituent circuits which test satisfactory or are in a "Don't care" state;

$T_{1UNRPT}$ is the number of constituent circuits which pass all tests or are out of service, thus accounting for full capacity of the multiplexed circuit, and Z is a factor that reflects a class-of-service designation for the multiplexed circuit.

4. The method according to claim 3 wherein the constant X ranges from 0 to 1.

5. The method according to claim 4 wherein the constant Y ranges from 0 to 1.

6. The method according to claim 4 wherein the constituent circuits each comprise T1 circuits and wherein the factor Z ranges from −28 to +28.

7. The method according to claim 1 wherein:

the network carries a plurality of multiplexed circuits;

the probability of failure is determined for each said multiplexed circuit:

the multiplexed circuits are rank ordered based on their probability of failure; and the circuits are restored based on their rank ordering.

8. The method according to claim 1 wherein the steps (a), (b) and (c) are performed periodically in sequence.

9. In combination with a network comprised of a plurality of nodes linked by transmission channels, each carrying at least one multiplexed circuit formed by multiplexing a plurality of constituent circuits, apparatus for restoring a failed circuit by routing the circuit over a combination of said channels, the apparatus comprising:

a database storing a record for each multiplexed circuit specifying (1) how many constituent circuits in the multiplexed circuit are provisioned for service; (2) how many constituent circuits in the multiplexed circuit have failed and (3) how many constituent circuits in the multiplexed circuit are in service and out of service; and a processor for accessing the data base to determine the probability of failure of at least one multiplexed circuit in accordance with (1) how many constituent circuits in the multiplexed circuit are provisioned for service; (2) how many constituent circuits in the multiplexed circuit have failed and (3) how many constituent circuits in the multiplexed circuit are in service and out of service, and for effecting restoration when the probability of failure differs from a prescribed reference value by a predetermined threshold.

10. The apparatus according to claim 9 wherein the processor determines the probability of failure of each multiplexed circuit and effects its restoration when the probability of failure differs from a prescribed reference value by a predetermined threshold.

11. The apparatus according to claim 9 wherein the processor determines the probability of failure of each multiplexed circuit, then rank orders the failure probabilities and thereafter effects restoration in accordance with the priority ranking.

12. The apparatus according to claim 9 wherein at least one multiplexed circuit comprises a T3 circuit having a maximum of twenty-eight constituent circuits.

* * * * *